United States Patent
Kwon et al.

(10) Patent No.: US 9,954,463 B2
(45) Date of Patent: Apr. 24, 2018

(54) ENERGY CONVERSION DEVICE USING CHANGE OF CONTACT SURFACE WITH LIQUID

(71) Applicant: Korea Electronics Technology Institute, Seongnam-si, Gyeonggi-do (KR)

(72) Inventors: Soon Hyung Kwon, Seoul (KR); Young Hoon Kim, Seongnam-si (KR); Min Suk Oh, Seoul (KR); Ji Wan Kim, Seongnam-si (KR); Byung Wook Yoo, Seongnam-si (KR); Youn Sang Kim, Suwon-si (KR); Jun Woo Park, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 259 days.

(21) Appl. No.: 14/646,995

(22) PCT Filed: Nov. 25, 2013

(86) PCT No.: PCT/KR2013/010716
§ 371 (c)(1),
(2) Date: May 22, 2015

(87) PCT Pub. No.: WO2014/081256
PCT Pub. Date: May 30, 2014

(65) Prior Publication Data
US 2015/0295516 A1    Oct. 15, 2015

(30) Foreign Application Priority Data

Nov. 26, 2012  (KR) .................. 10-2012-0134389

(51) Int. Cl.
*H02N 1/00* (2006.01)
*H02N 1/08* (2006.01)

(52) U.S. Cl.
CPC .............. *H02N 1/00* (2013.01); *H02N 1/08* (2013.01)

(58) Field of Classification Search
CPC .................................. H02N 1/08; H02N 1/00
(Continued)

(56) References Cited

U.S. PATENT DOCUMENTS

| 7,898,096 B1 | 3/2011 | Krupenkin | |
| 8,760,032 B2 * | 6/2014 | Despesse | H02N 1/08 310/309 |

(Continued)

FOREIGN PATENT DOCUMENTS

| FR | 2 925 792 A1 | 6/2009 |
| JP | 8-140369 A | 5/1996 |

(Continued)

OTHER PUBLICATIONS

Korean Patent Office, Office Action dated Aug. 20, 2013, issued in corresponding KR 10-2012-0134389.

(Continued)

*Primary Examiner* — Forrest M Phillips
(74) *Attorney, Agent, or Firm* — Sughrue Mion, PLLC

(57) ABSTRACT

The present invention relates to an energy conversion device using a change of a contact surface with liquid and, more specifically, to a method and a device for converting mechanical energy into electrical energy by applying an opposite phenomenon to an electrowetting phenomenon. The energy conversion device having a simplified structure and reduced manufacturing costs with minimal malfunctions by changing a contact surface with liquid between a pair of electrodes and using the change of the contact surface with the liquid to generate electrical energy such that channel (Continued)

blocking can be prevented or a lubricating layer or electrodes complicatedly patterned on a channel are not required.

21 Claims, 5 Drawing Sheets

(58) Field of Classification Search
USPC .......................................................... 310/300
See application file for complete search history.

(56) References Cited

U.S. PATENT DOCUMENTS

| | | | |
|---|---|---|---|
| 2009/0121585 A1 | 5/2009 | Lee et al. | |
| 2010/0295415 A1 | 11/2010 | Despesse et al. | |
| 2011/0163630 A1* | 7/2011 | Klootwijk | B06B 1/0292 |
| | | | 310/300 |
| 2012/0177907 A1* | 7/2012 | Koike | B32B 27/08 |
| | | | 428/304.4 |
| 2013/0106317 A1* | 5/2013 | Ludois | H02N 1/00 |
| | | | 318/116 |
| 2013/0222879 A1* | 8/2013 | Kuo | G02B 26/005 |
| | | | 359/290 |
| 2013/0307370 A1* | 11/2013 | Jenninger | H01L 41/113 |
| | | | 310/300 |
| 2014/0216559 A1* | 8/2014 | Foley | B01F 13/0076 |
| | | | 137/1 |
| 2014/0287328 A1* | 9/2014 | Samukawa | H01M 8/2465 |
| | | | 429/401 |
| 2015/0214861 A1* | 7/2015 | Denes | H02N 2/043 |
| | | | 417/322 |
| 2015/0295516 A1* | 10/2015 | Kwon | H02N 1/08 |
| | | | 310/300 |
| 2015/0303831 A1* | 10/2015 | Kwon | H02N 11/002 |
| | | | 310/300 |
| 2015/0311823 A1* | 10/2015 | Wang | H02N 1/04 |
| | | | 310/300 |
| 2015/0340968 A1* | 11/2015 | Inaba | B81B 3/007 |
| | | | 310/300 |
| 2015/0340970 A1* | 11/2015 | Kwon | H02N 11/002 |
| | | | 310/300 |

FOREIGN PATENT DOCUMENTS

| | | |
|---|---|---|
| JP | 3501216 B2 | 3/2004 |
| JP | 2008-507250 A | 3/2008 |
| JP | 2011-507479 A | 3/2011 |
| JP | 2012-55095 A | 3/2012 |
| KR | 10-2009-0018470 A | 2/2009 |
| KR | 10-2010-0005805 A | 1/2010 |

OTHER PUBLICATIONS

Korean Patent Office, Notice of Allowance dated Nov. 15, 2013, issued in corresponding KR 10-2012-0134389.

International Searching Authority, International Search Report for PCT/KR2013/010716 dated Feb. 17, 2014.

Krupenkin, Tom et al., "Reverse electrowetting as a new approach to high-power energy harvesting", Nature Communications, Aug. 23, 2011, DOI: 10.1038/ncomms1454, pp. 448, (total 8 pages).

Kwon, Soon-Hyung et al., "An effective energy harvesting method from a natural water motion active transducer", Energy & Communication Science, Oct. 2014, vol. 7, No. 10, pp. 3279-3283, (total 6 pages).

European Patent Office, Communication dated Jun. 28, 2016, issued in counterpart European Application No. 13857613.7.

* cited by examiner

ENERGY CONVERSION DEVICE USING CHANGE OF CONTACT SURFACE WITH LIQUID

CROSS REFERENCE TO RELATED APPLICATIONS

This application is a National Stage of International Application No. PCT/KR2013/010716 filed Nov. 25, 2013, claiming priority based on Korean Patent Application No. 10-2012-0134389 filed Nov. 26, 2012, the contents of all of which are incorporated herein by reference in their entirety.

TECHNICAL FIELD

The present invention relates to an energy conversion device using change of contact surface contacting liquid, more specifically, to a method and a device for converting mechanical energy into electrical energy by applying a reciprocal phenomenon of electrowetting.

BACKGROUND ART

The energy conversion technologies for converting mechanical energy into electrical energy of prior art use a principle that electrical capacitance is being created in the electrode under a dielectric material by varying the contact surface of a liquid metal which is in contact with a dielectric material in accordance with the flow of time.

A method and a device for converting energy using a fluid of prior art is being disclosed in the U.S. Pat. No. 7,898,096.

FIG. 1 is a block diagram of a device of prior art for converting energy using a fluid. According to FIG. 1, in a device of prior art for converting energy using a fluid, an electrode is formed to have a consistent pattern on the wall of a thin and long channel, and a dielectric material layer is formed above the electrode. Then, a little waterdrop-like conductive liquid and a non-conductive liquid are being injected into the channel, and by applying a voltage from an external power source to such a waterdrop-like conductive liquid, the conductive liquid is being depolarized.

At this state, when a physical pressure is applied to a predetermined portion (not shown) which is connected to the channel the depolarized waterdrop-like conductive liquid is moved along the channel, and during this process, the contact surface of the multiple electrodes, which is formed with a consistent pattern, with the moving multiple conductive liquid drop is continuously changing with time, and as a result, an electrical energy is generated due to the electrical capacitance change.

However, a method and a device of prior art for converting energy using a fluid have various problems for commercialization.

First, since a reversible movement, wherein a drop-like liquid metal, which has been moved inside the narrow and thin channel, is returning back to its original position when the external force is removed, is difficult, there is a limitation in that a separate lubricating layer is required and an inoperable condition happens due to the easy occurrence of the channel blocking phenomenon.

Moreover, since a method and a device of prior art for converting energy using a fluid adopt a narrow and thin channel structure, the two facing electrodes must be patterned with a fixed shape on the channel wall, and the device configuration becomes complicated due to such a structure, and the size of the module producing electrical energy becomes large, and there are many limitation in mass production or cost reduction.

In addition, as for other problems, it is harmful to the human body and the environment by using a liquid metal such as mercury or galinstan, and there is a limitation in that application of an external separate power source is required for depolarizing such a conductive liquid.

Further, a method and a device of prior art for converting energy using a fluid has problems in that the reversible movements in the channel structure must be continuously implemented, and the control is difficult since the two different kinds of immiscible liquids must be used.

SUMMARY OF INVENTION

Technical Problem

An objective of the present invention is to provide a method and a device for converting energy using a fluid, especially for generating electrical energy by changing the contact surface between the liquid and the electrodes in the device.

Another objective of the present invention is to provide a method and a device for converting energy having a simple structure, high conversion efficiency, and low failure rates by using an energy conversion layer.

Solution to Problem

To achieve above described objectives, an energy conversion device using the change of the contact surface between liquid and an electrode includes: a first electrode substrate and a second electrode substrate which are spaced apart and facing each other; an ionic liquid or water which is in contact with the first electrode substrate and the second electrode substrate, wherein the contact surface of each electrode substrate is to be changed; and an energy conversion layer, which is formed in at least one of the first electrode substrate and the second electrode substrate, generating electrical energy in accordance with the change of the contact surface.

Preferably, it is characterized in that the energy conversion layer includes at least one of an inorganic material layer, an organic material layer and a layer comprising a mixture of organic and inorganic materials.

Preferably, it is characterized in that a structure for enlarging the contact surface, which is in contact with the ionic liquid or water, is formed in the energy conversion layer.

Preferably, it is characterized in that the energy conversion devices are plurally connected in an array form.

Preferably, it is characterized in that at least a part of a plurality of substrates which constitute the plurality of energy conversion devices are supported by a common supporting structure.

Preferably, it is characterized in that at least one of the electrode substrates generates electrical energy by moving in such a way that a degree of immersion thereof into the ionic liquid or water changes.

Preferably, it is characterized in that a hydrophobic material layer is stacked on the energy conversion layer so as to facilitate the change of contact surface contacting the ionic liquid or water in accordance with the change in the degree of immersion.

Preferably, it is characterized in that the hydrophobic material layer includes at least one of silane-based material, fluoropolymer material, trichlorosilane, trimethoxysilane, pentafluorophenylpropyltrichlorosilane, (benzyloxy)alkyltrimethoxysilane (BSM-22), (benzyloxy)alkyltrichlorosilane (BTS) hexamethyldisilazane (HMDS), octadecyltrichlorosilane (OTS), octadecyltrimethoxysilane (OTMS) and divinyltetramethyldisiloxane-bis(benzocyclobutene) (BCB).

Preferably, it is characterized in that the ionic liquid includes at least one of NaCl, LiCl, $NaNO_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol and AgCl.

An energy conversion device using the change of the contact surface between liquid and an electrodes includes: a first electrode substrate and a second electrode substrate which are spaced apart and facing each other; a conductive liquid which is in contact with the first electrode substrate and the second electrode substrate, wherein the contact surface of the each electrode substrate is to be changed; and an energy conversion layer, which is formed in at least one of the first electrode substrate and the second electrode substrate, generating electrical energy in accordance with the change of the contact surface.

Preferably, it is characterized in that the energy conversion layer is comprised of stacked layers of an inorganic material layer and an organic material layer, wherein a hydrophile material layer is stacked on the energy conversion layer so that the conductive liquid facilitates the change of the contact surface in accordance with the change.

Preferably, it is characterized in that the inorganic material layer or the organic material layer has a structure for enlarging the contact surface contacting the conductive liquid.

Preferably, it is characterized in that the energy conversion devices are plurally connected in an array form.

Preferably, it is characterized in that at least a part of a plurality of substrates which constitute the plurality of energy conversion devices are supported by a common supporting structure.

Preferably, it is characterized in that at least one of the electrode substrates generates electrical energy by moving in such a way that a degree of immersion thereof into the conductive liquid changes.

Preferably, it is characterized in that the hydrophile material layer includes: poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, or a material including at least one functional group of —NH, —CO—, amino group —$NH_2$, hydroxyl group —OH and carboxyl group —COOH.

Preferably, it is characterized in that the range of the specific resistivity of the conductive liquid is 1 $\mu\Omega$/cm to 1000 $\mu\Omega$/cm, and the dielectric constant K is lower than or equal to 5.

Preferably, it is characterized in that the energy conversion layer includes: an organic material layer including at least one material of polymethylmethacrylate (PMMA), polyethylene (PE), polystyrene (PS), polyvinylpyrrolidone (PVP), poly(4-vinylpenol) (PVP) or polyethersulfone (PES), poly(4-methoxyphenylacrylate; PMPA), poly(phenylacrylate) (PPA), poly(2,2,2-trifluoroethyl methacrylate) (PTFMA), cyanoethylpullulan (CYEPL), polyvinyl chloride (PVC), poly(parabanic acid resin) (PPA), poly(t-butylstyrene) (PTBS), polythienylenevinylene (PTV), polyvinylacetate (PVA), poly(vinyl alcohol) (PVA), poly(rmethylstyrene) (PAMS), poly(vinyl alcohol)-co-poly(vinyl acetate)-co-poly(itaconic acid) (PVAIA), polyolefin, polyacrylate, parylene-C, polyimide, octadecyltrichlorosilane (OTS), poly (triarylamine) (PTTA), poly-3-hexylthiophene (P3HT), cross-linked poly-4-vinylphenol (cross-linked PVP), poly (perfluoroalkenylvinyl ether), nylon-6, n-octadecylphosphonic acid (ODPA), polytetrafluoroethylene (PTFE), silicone, polyurethane, latex, cellulose acetate, poly(hydroxy ethyl methacrylate) (PHEMA), polylactide (PLA), polyglycolide (PGA) and polyglycolide-co-lactide (PGLA); and an inorganic material layer including at least one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide ($Y_2O_3$), cerium oxide ($CeO_2$), titanium dioxide ($TiO_2$), barium titanate (BaTiO_3), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), perovskite materials, strontium titanate (SrTiO3), barium strontium titanate (BST), lead zirconate titanate (PZT), calcium copper titanate (CCTO), $HfO_2$, apatite ($A_{10}(MO_4)_6X_2$), hydroxyapatite ($Ca_{10}(PO_4)_6$ $(OH)_2$), tricalcium phosphate ($Ca_3(PO_4)_2$), $Na_2O$—CaO—$SiO_2$ and bioglass (CaO—$SiO_2$—$P_2O_5$).

Preferably, it is characterized in that the first electrode substrate or the second electrode substrate includes an electrode, wherein the electrode is an inorganic electrode including at least one of ITO, IGO, chrome, aluminum, indium zinc oxide (IZO), indium gallium zinc oxide (IGZO), ZnO, $ZnO_2$ and $TiO_2$; or a metal electrode including at least one of platinum, gold, silver, aluminum, iron and copper; or an organic electrode including at least one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of chrome, SUS 304, SUS 316, SUS 316L, Co—Cr alloy, Ti alloy, nitinol (Ni—Ti) and polyparaphenylenevinylene.

Preferably, it is characterized in that at least one of the first electrode substrate or the second electrode substrate is a metal substrate, a glass substrate, a ceramic substrate or a polymer material substrate, wherein the polymer material substrate is a plastic substrate or a film which includes at least one of polyethylene terephthalate (PET), polyarylate (PAR), polymethylmethacrylate (PMMA), polyethylenenaphthalate (PEN), polyethersulfone (PES), polyimide (PI), polycarbonate (PC) and fiber reinforced plastics (FRP), and the ceramic substrate is a substrate using a ceramic material which includes at least one of alumina ($Al_2O_3$), bertha (BeO), aluminum nitride (AlN), silicon carbide (SiC), mullite and silicon.

Preferably, it is characterized in that a non-conductive gas, which is disposed between the first electrode substrate and the second electrode substrate, is further included in the energy conversion device.

Preferably, the non-conductive gas includes at least one of air, oxygen, nitrogen, argon, helium, neon, krypton, xenon and radon.

The details of the other exemplary embodiments are included in the detailed description of embodiments and the drawings.

Advantageous Effects of Invention

The present invention changes the contact surface of liquid between a pair of electrodes, and utilizes the resulting change in the contact surface of the liquid for electrical energy generation. Thus, it has an effect of implementing an energy conversion device having less failures with a simplified device structure and a reduced manufacturing cost by preventing the channel blocking phenomenon, and by not requiring any lubrication layer, or any complicatedly patterned electrodes in the channel.

In addition, the present invention is advantageous in that efficient electrical energy conversion is possible without separately applying external power.

And, the present invention has an effect on solving the harmful problem to the human body and the environment by using an ionic liquid or water.

DETAILED DESCRIPTION OF EMBODIMENT

The advantages and the features of the present invention, and the method for achieving thereof will become apparent with reference to the exemplary embodiments described in detail hereinafter with the accompanying drawings. However, the present invention will not be limited to the exemplary embodiments described hereinafter, but will be implemented in a various different forms, and the exemplary embodiments are provided for the completeness of the disclosure of the present invention and to teach an ordinary person of skill in the art of the scope of the invention completely, and the present invention is only be defined by the scope of the claims. Meanwhile, the terms used in the description are for describing the exemplary embodiments, but not to limit the present invention.

Figure 1:
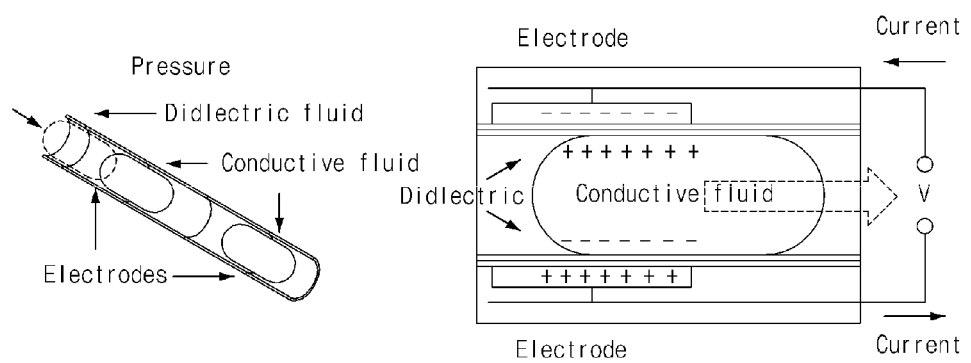
FIG. 1 is a block diagram of an energy conversion device using a fluid of prior art.
Figure 2:
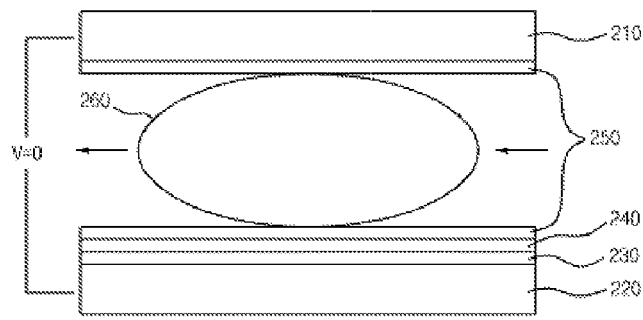
FIG. 2 is a structural illustration of an energy conversion device using the change of the contact surface of a liquid according to an exemplary embodiment of the present invention.

FIG. 2 is a structural illustration of an energy conversion device using the change of the contact surface of a liquid according to an exemplary embodiment of the present invention. According to FIG. 2, an energy conversion device using the change of the contact surface of a liquid according to an exemplary embodiment of the present invention includes a first electrode substrate 210 and a second electrode substrate 220 which are spaced apart and facing each other, wherein an ionic liquid or water 260, which is in contact with the electrode substrates, and the contact surface thereof changes, is disposed between the electrode substrates.

In addition, energy conversion layers 230 and 240, which generate electrical energy according to the change in the contact surface contacting the ionic liquid or water, are stacked on the first electrode substrate 210 or on the second electrode substrate 220.

For the convenience of describing the energy conversion device using the change of the contact surface of a liquid according to an exemplary embodiment of the present invention, it is shown that the ionic liquid or water 260 is positioned between the first electrode substrate 210 and the second electrode substrate 220. However, such structure is all right for that specific situation, therefore it should not be interpreted by limiting to any structural type to maintain such position.

An energy conversion device using the change of the contact surface of a liquid according to an exemplary embodiment of the present invention generates electrical energy by changing the electrical capacitance of the electrodes included in the first electrode substrate 210 and the second electrode substrate 220 according to the change of the contact surface of the ionic liquid or water in the energy conversion layers 230 and 240.

Figure 3:
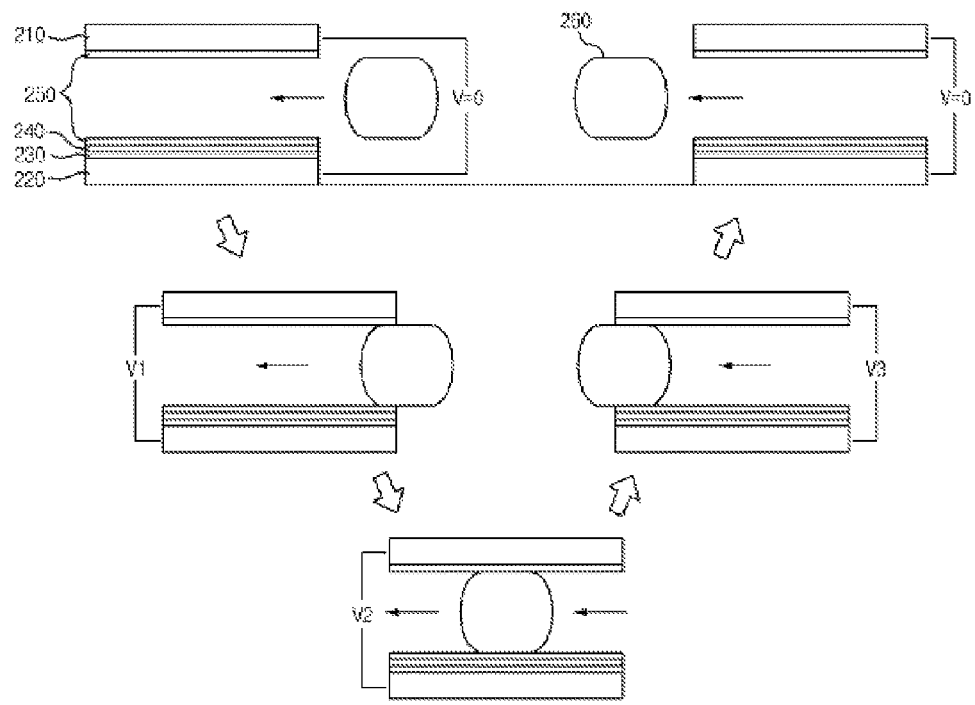
FIG. 3 is a conceptual diagram describing the operation principle of an energy conversion device using the change of the contact surface of a liquid according to an exemplary embodiment of the present invention.

FIG. 3 is a conceptual diagram describing the operation principle of an energy conversion device using the change of the contact surface of a liquid according to an exemplary embodiment of the present invention. As illustrated in FIG. 3, an energy conversion device using the change of the contact surface of a liquid according to an exemplary embodiment of the present invention generates electrical energy as the ionic liquid or water 260 is moving between: the second electrode substrate 220, wherein an inorganic material layer 230, an organic material layer 240, and a hydrophobic material layer 250 are sequentially stacked; and the first electrode layer 210 wherein a hydrophobic material layer 250 is stacked, while both the second electrode substrate 220 and the first electrode substrate 210 are being touched by the liquid or water 260.

Figure 4A:
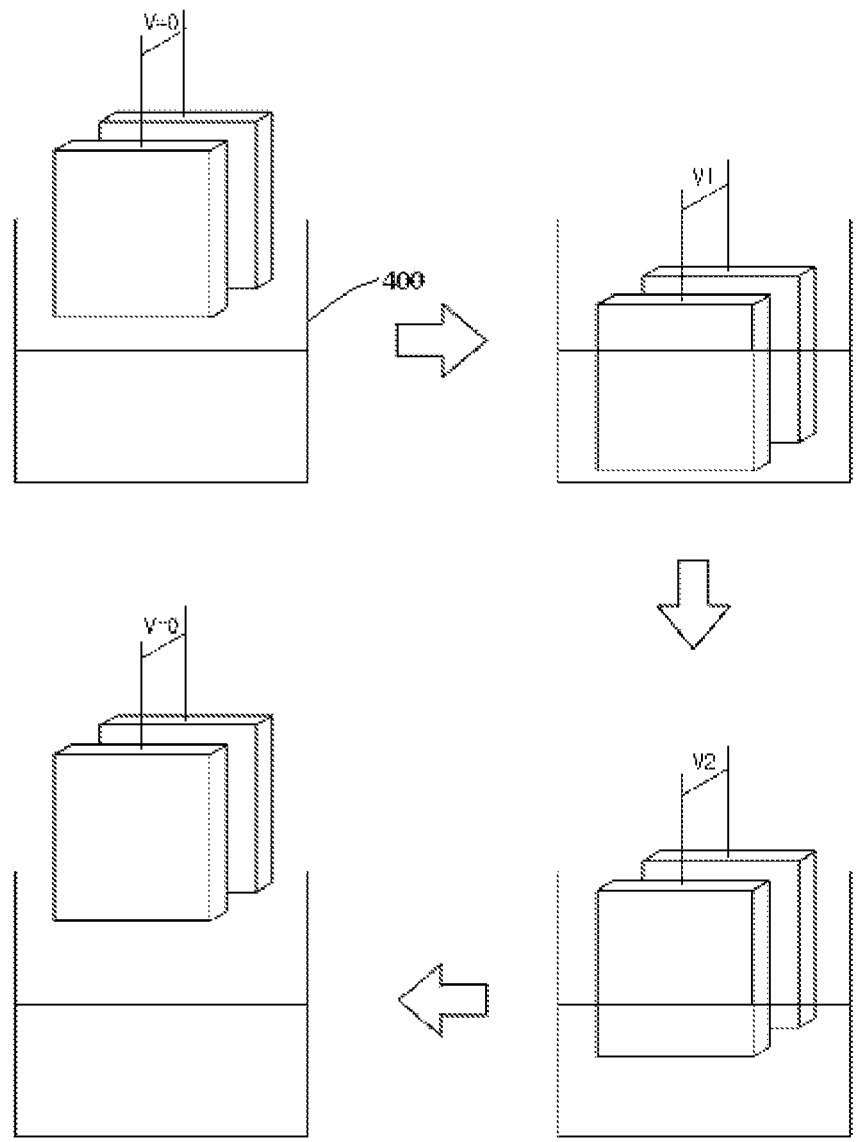
FIG. 4a is a conceptual diagram describing the operation principle of an energy conversion device using the change of the contact surface of a liquid according to another exemplary embodiment of the present invention.

FIG. 4a is a conceptual diagram describing the operation principle of an energy conversion device using the change of the contact surface of a liquid according to another exemplary embodiment of the present invention. FIG. 4a is an exemplary embodiment for the convenience of describing that the first electrode substrate 210 and the second electrode substrate 220, whereon the energy conversion layers are deposited, are immersed into the storage 400, wherein the ionic liquid or water 260 is stored, and thereafter pulled out, however, the claims should not be limitedly interpreted based on this example.

As illustrated in FIG. 4a, at the initial moment, no electrical output energy is generated from the energy conversion device using change of contact surface contacting liquid. Later, as the assembly comprising the first electrode substrate 210 and the second electrode substrate 220 are being immersed into the storage 400 wherein the ionic liquid or water 260 is stored, at least one of the contact surface, the contact area and the contact angle between the electrodes, which are included in first electrode substrate 210 and the second electrode substrate 220, and the ionic liquid and water 260 changes, thereby generating electrical energies V1 and V2, each having a constant polarity. At this time, when the assembly comprising the first electrode substrate 210 and the second electrode substrate 220 are being pulled out of the storage 400 wherein the ionic liquid or water 260 is stored, the initial electrical output energy becomes 0. By repeating this process, a continual generation of energy becomes possible. FIG. 4 illustrates that the change of the contact area is generated by a simultaneous linear motion of a pair of the electrode substrates at a constant speed, however, an exemplary embodiment of the present example is not limited to this, and it may be equally applied to the case where a change occurs in the area which is being immersed in the liquid, that is the contact area, when a pair of electrode substrates are moving with different speeds from each other or in a non-linear manner.

Figure 4B:
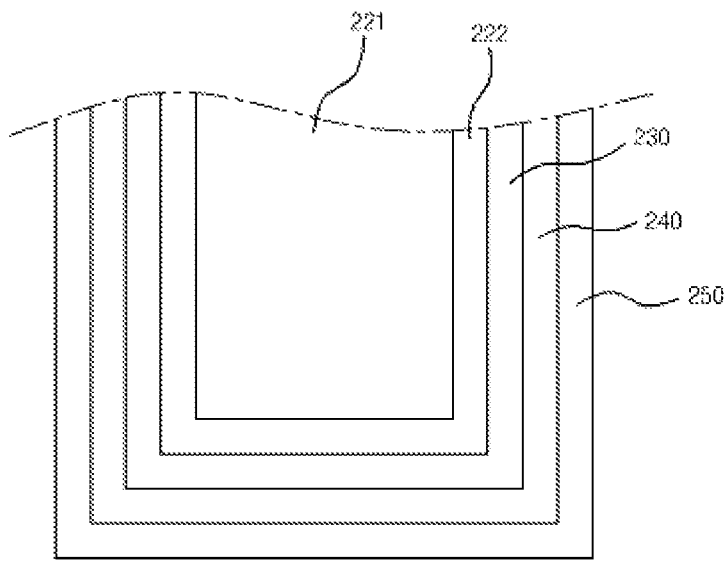
FIG. 4b is a cross-sectional view of an energy conversion device using the change of the contact surface of a liquid according to another exemplary embodiment of the present invention.
Figure 5A:
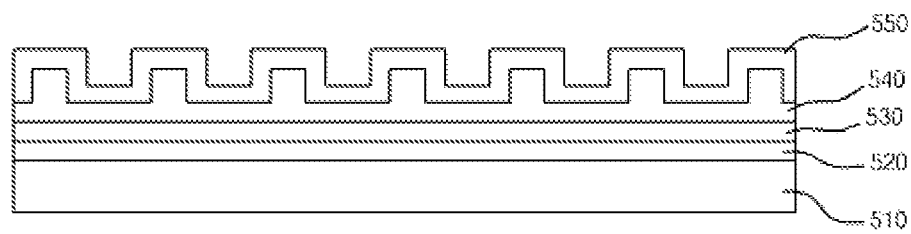
FIGS. 5a-5d are side views illustrating the exemplary embodiments of the energy conversion layer of an energy conversion device using change of contact surface contacting liquid according to an exemplary embodiment of the present invention.
Figure 5B:
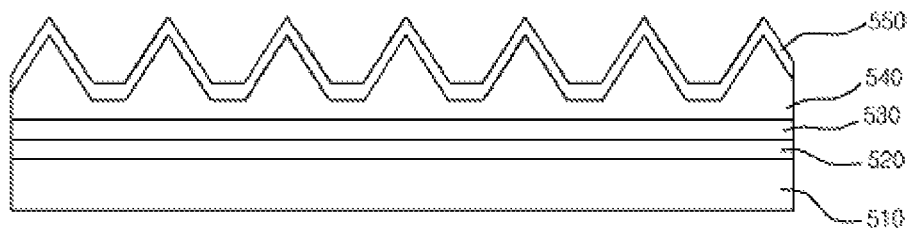
Figure 5C:
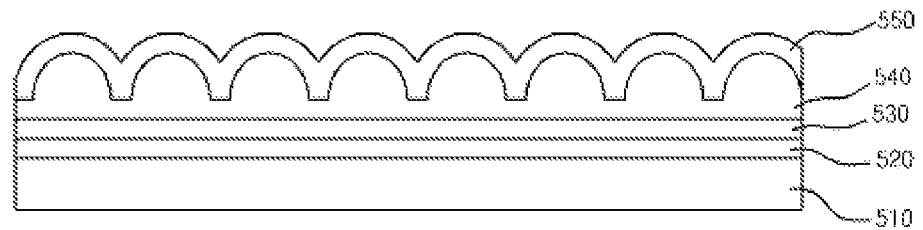
Figure 5D:
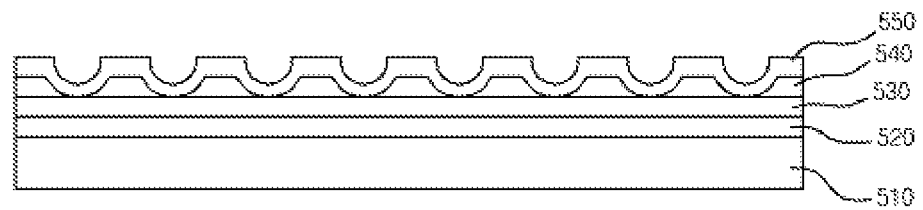

FIG. 4b is a cross-sectional view of an energy conversion device using the change of the contact surface of a liquid according to another exemplary embodiment of the present invention, which is described in FIG. 4a. Referring to FIG. 4b, the first electrode substrate 210 or the second electrode substrate 220 is configured such that the substrate 221 is surrounded by the electrode 222. In addition, an inorganic material layer 230, an organic material layer 240, and a hydrophobic material layer 250 are sequentially stacked on the electrode 222 which surrounds the substrate 221.

In such case, although an example comprising a pair comprising a first electrode substrate 210 and a second electrode substrate 220 is shown in FIG. 4a, it may be comprised of an odd number of pairs.

Again referring to FIG. 2, according to a preferred exemplary embodiment of the present invention, an energy conversion layer is comprised by stacking an inorganic material layer 230 and/or an organic material layer 240. Preferably, a methods such as patterning, vacuum deposition, or spin coating may be used in forming such energy conversion layer.

In stacking the inorganic material layer 230 and the organic material layer 240 on the first electrode substrate 210 or on the second electrode substrate 220, the order of stacking will not matter, however, they must be stacked adjacently.

Preferably, the inorganic material layer 230 and the organic material layer 240 may be alternately and repeatedly filed up when being stacked on the first electrode substrate 210 or on the second electrode substrate 220. In other words, an energy conversion layer can be formed by repeatedly stacking the inorganic material layer 230 and the organic material layer 240.

According to a preferred exemplary embodiment of the present invention, an inorganic material layer 230 or an organic material layer 240 is deposited such that a structure for enlarging the contact surface contacting the ionic liquid or water 260 is formed thereat.

FIGS. 5a-5d are side views illustrating the exemplary embodiments of the energy conversion layer of an energy conversion device using change of contact surface contacting liquid according to an exemplary embodiment of the present invention. Referring to FIGS. 5a-5d, an inorganic material layer 530 is deposited on the electrode 520 which is included in the first electrode substrate 510 as an energy conversion layer of an energy conversion device using change of contact surface contacting liquid according to an exemplary embodiment of the present invention. The organic material layer 540 is stacked on the inorganic material layer 530 to form a micro structure having shapes such as a convex-concave shape shown in FIG. 5a, a sharply protruded shape shown in FIG. 5b, a semi sphere shape shown in FIG. 5c, and a spherical pit shape shown FIG. 5d. Preferably, the stacking order between the organic material layer 540 and the inorganic material layer 530 may be reversed, and the stacking material for forming the structure is not necessarily to be an organic material layer 540.

Preferably, a hydrophobic material layer 550 is stacked on the organic material layer 540 which is being stacked for forming the structure so that the shape of the structure is being maintained.

Such shapes of the structure have effects on increasing the generation efficiency of electrical energy by enlarging the change in the contact area between the electrodes and the ionic liquid or water.

Again referring to FIG. 2, the energy conversion devices using change of contact surface contacting liquid are plurally connected in an array form according to a preferred exemplary embodiment of the present invention. As previously described, this is to increase the generation efficiency of electrical energy by enlarging the change in the contact area between the electrodes and the ionic liquid or water.

Meanwhile, when the energy conversion devices according to the present invention are used in plural forms, the substrates constituting the plural energy conversion device also form plural pairs, such multiple pairs of the electrodes are being supported by the common supporting structure (not shown), then being immersed in the ionic liquid or water, or being moved by a consistent external force and the like so that the contact area changes with time.

According to a preferred exemplary embodiment of the present invention, a hydrophobic material layer 250 is stacked on the energy conversion layers 230 and 240 so as to facilitate the change of the contact surface between the electrodes 210 and 220 and the ionic liquid or water 260.

Preferably, the hydrophobic material layer 250 may be stacked on the first electrode substrate 210 or on the second electrode substrate 220 wherein no energy conversion layer is formed.

According to a preferred exemplary embodiment of the present invention, an organic material layer 240 includes one material of polymethylmethacrylate (PMMA), polyethylene (PE), polystyrene (PS), polyvinylpyrrolidone (PVP), poly (4-vinylpenol) (PVP) or polyethersulfone (PES), poly(4-methoxyphenylacrylate; PMPA), poly(phenylacrylate) (PPA), poly(2,2,2-trifluoroethyl methacrylate) (PTFMA), cyanoethylpullulan (CYEPL), polyvinyl chloride (PVC), poly(parabanic acid resin) (PPA), poly(t-butylstyrene) (PTBS), polythienylenevinylene (PTV), polyvinylacetate (PVA), poly(vinyl alcohol) (PVA), poly(rmethylstyrene) (PAMS), poly(vinyl alcohol)-co-poly(vinyl acetate)-co-poly (itaconic acid) (PVAIA), polyolefin, polyacrylate, parylene-C, polyimide, octadecyltrichlorosilane (OTS), poly(tri-arylamine) (PTTA), poly-3-hexylthiophene (P3HT), cross-linked poly-4-vinylphenol (cross-linked PVP), poly (perfluoroalkenylvinyl ether), nylon-6, n-octadecylphosphonic acid (ODPA), polytetrafluoroethylene (PTFE), silicone, polyurethane, latex, cellulose acetate, poly(hydroxy ethyl methacrylate) (PHEMA), polylactide (PLA), polyglycolide (PGA), or polyglycolide-co-lactide (PGLA). In addition, an inorganic material layer 230 includes at least one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide ($Y_2O_3$), cerium oxide ($CeO_2$), titanium dioxide ($TiO_2$), barium titanate ($BaTiO_3$), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), perovskite materials, strontium titanate ($SrTiO3$), barium strontium titanate (BST), lead zirconate titanate (PZT), calcium copper titanate (CCTO), $HfO_2$, apatite ($A_{10}(MO_4)_6X_2$), hydroxyapatite ($Ca_{10}(PO_4)_6(OH)_2$), tricalcium phosphate ($Ca_3(PO_4)_2$), $Na_2O$—$CaO$—$SiO_2$ and bioglass ($CaO$—$SiO_2$—$P_2O_5$).

Preferably, a material having dielectric constant (K) lower than 4 may be used for the organic material 240, and a material having dielectric constant (K) higher than 5 may be used for the inorganic material 230.

According to a preferred exemplary embodiment of the present invention, hydrophobic material layer 250 includes at least one of silane-based material, fluoropolymer material, trichlorosilane, trimethoxysilane, pentafluorophenylpropyl-trichlorosilane, (benzyloxy)alkyltrimethoxysilane (BSM-22), (benzyloxy)alkyltrichlorosilane (BTS), hexamethyldisilazane (HMDS), octadecyltrichlorosilane (OTS), octadecyltrimethoxysilane (OTMS) and divinyltetramethyl-disiloxane-bis(benzocyclobutene) (BCB).

According to a preferred exemplary embodiment of the present invention, the electrodes used in the first electrode 210 or the second electrode 220 is an inorganic electrode which includes at least one of ITO, IGO, chrome, aluminum, indium zinc oxide (IZO), indium gallium zinc oxide (IGZO), ZnO, $ZnO_2$ and $TiO_2$; or a metal electrode including at least one of aluminum, iron or copper; or an organic electrode including at least one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of chrome, SUS 304, SUS 316, SUS 316L, Co—Cr alloy, Ti alloy, nitinol (Ni—Ti) and polyparaphenylenevinylene.

In addition, according to a preferred exemplary embodiment of the present invention, the first electrode substrate 210 or the second electrode substrate 220 is a metal substrate, a glass substrate, a ceramic substrate, or a polymer material substrate. Here, the polymer material substrate is a plastic substrate or a film which includes at least one of polyethylene terephthalate (PET), polyarylate (PAR), polymethylmethacrylate (PMMA), polyethylenenaphthalate (PEN), polyethersulfone (PES), polyimide (PI), polycarbonate (PC) and fiber reinforced plastics (FRP). In addition, the ceramic substrate is a substrate using a ceramic material which includes at least one of alumina ($Al_2O_3$), berilia (BeO), aluminum nitride (AlN), silicon carbide (SiC), mullite and silicon.

According to a preferred exemplary embodiment of the present invention, the ionic liquid 260 includes at least one of NaCl, LiCl, $NaNO_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol and AgCl.

According to a preferred exemplary embodiment of the present invention, it is configured to fill the space between the first electrode substrate 210 and the second electrode substrate 220 with a non-conductive gas. Generally, the space between the first electrode substrate 210 and the second electrode substrate 220 could be a normal aerial environment.

According to a preferred exemplary embodiment of the present invention, the non-conductive gas includes at least one of air, oxygen, nitrogen, argon, helium, neon, krypton, xenon and radon.

Figure 6:
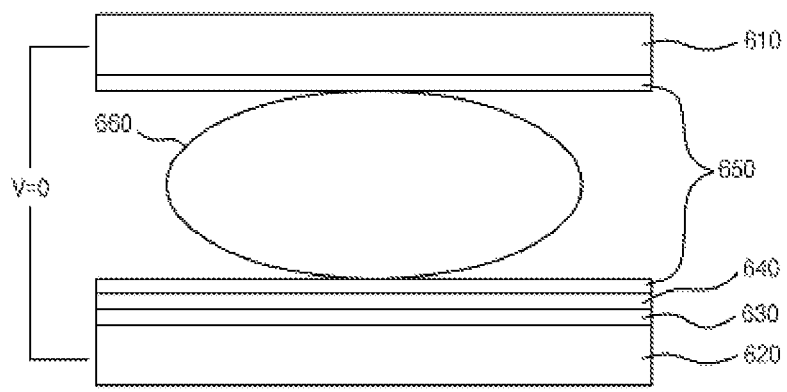
FIG. 6 is a structural drawing of an energy conversion device using the change of the contact surface of a liquid according to another exemplary embodiment of the present invention.

FIG. 6 is a structural drawing of an energy conversion device using the change of the contact surface of a liquid according to another exemplary embodiment of the present invention. Referring to FIG. 6, an energy conversion device using the change of the contact surface of a liquid according to a preferred exemplary embodiment of the present invention includes a first electrode substrate 610 and a second electrode substrate 620 which are spaced apart and facing each other, wherein a conductive liquid 660, which is in contact with the electrode substrates and the contact surface thereof changes, is positioned between the electrode substrates.

In addition, energy conversion layers 630 and 640, which generate electrical energy in accordance with the change in the contact surface contacting the conductive liquid 660, are stacked on the first electrode substrate 610 and the second electrode substrate 620.

According to a preferred exemplary embodiment of the present invention, it is preferred that the conductive liquid 660 may use mercury, lithium, gallium, kalium, NaK, bismuth, tin, natrium, natrium-kalium alloy, and the like; the range of the specific resistivity is 1 μΩ/cm to 1000 μΩ/cm, and the dielectric constant K is lower than or equal to 5.

According to a preferred exemplary embodiment of the present invention, a hydrophile material layer 650 is stacked on the energy conversion layers 630 and 640 so as to facilitate the change of the contact surface between the conductive liquid 660 and the electrode substrates 610 and 620.

According to a preferred exemplary embodiment of the present invention, a hydrophile material layer 650 includes poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, and materials including one functional group of —NH, —CO—, amino group —$NH_2$, hydroxyl group —OH or carboxyl group —COOH.

Besides, in the above described exemplary embodiment using a conductive liquid, the detailed descriptions of the technical contents related to materials of the electrodes or the substrates constituting the first electrode substrate 610 and the second electrode substrate 620, the features and the structure of the inorganic material layer 630 and the organic material layer 640, the usage of the energy conversion devices of the present invention in a multiple manner, and the like are omitted since it can be configured according to the foregoing exemplary embodiments using the ionic liquid or water, or the contents described in FIG. 2 or FIG. 3, and FIGS. 4a to 4b.

As reviewed before, when compared with prior art using more than two different kinds of liquids, the present invention may prevent blocking and mixing phenomena inside the channel, and also it does not require any lubricating layer.

Furthermore, although the technologies of prior art suggests an insulation layer comprising a single self assembly molecular monolayer and a single dielectric layer, or more layers of non-conductive layers, or the various combination thereof, however, the present invention suggests a structure for optimizing the energy conversion efficiency. In other words, when using an ionic liquid, it is configured to have a structure of electrode/inorganic material layer/organic material layer/hydrophobic material layer or electrode/organic material layer/inorganic material layer/hydrophobic material layer (according to the stacking order) on at least one side of the substrate of the first electrode substrate or the second electrode substrate; when using a conductive liquid, it is configured to have a structure of electrode/inorganic material layer/organic material layer/hydrophile material layer or electrode/organic material layer/inorganic material layer/hydrophile material layer (according to the stacking order) on both of the first electrode substrate and the second electrode substrate.

And, application of an external power source for depolarization is required in using a conductive liquid according to the technology of prior art, however, application of an external power source is not required in the present invention since the energy conversion layer performs depolarizing function for the ionic liquid.

Although the preferred exemplary embodiments and the application examples are illustrated and described, heretofore, the present invention is not limited by the above described specific exemplary embodiments and the application examples, naturally, various variant embodiments are possible by a person of ordinary skill in the art without departing the gist of the present invention claimed within the scope of the claims, and these variant embodiments should not be individually understood from the technical spirit or the expectation of the present invention.

DESCRIPTION OF SYMBOLS

210: first electrode substrate
220: second electrode substrate
230: inorganic material layer
240: organic material layer
250: hydrophobic material layer
260: ionic liquid or water

What is claimed is:

1. An energy conversion device using change of contact surface contacting liquid, comprising:
    a first electrode substrate and a second electrode substrate which are spaced apart and facing each other;
    an ionic liquid or water which is in contact with the first electrode substrate and the second electrode substrate, wherein the contact surface of each electrode substrate is to be changed; and
    an energy conversion layer, which is formed in at least one of the first electrode substrate and the second electrode substrate, generating electrical energy in accordance with the change of the contact surface,
    wherein the energy conversion layer includes a layer comprising a mixture of organic and inorganic materials, and
    wherein the energy conversion device is not connected to an external power source for depolarizing the ionic liquid or water.

2. The energy conversion device using change of contact surface contacting liquid according to claim 1,
    wherein the layer has a structure for enlarging the contact surface contacting the ionic liquid or water.

3. The energy conversion device using change of contact surface contacting liquid according to claim 1,
    wherein the energy conversion device is connected to one or more of other energy conversion devices in an array form.

4. The energy conversion device using change of contact surface contacting liquid according to claim 3,
    wherein at least a part of a plurality of substrates which constitute a plurality of energy conversion devices including the energy conversion device and said one or more of other energy conversion devices are supported by a common supporting structure.

5. The energy conversion device using change of contact surface contacting liquid according to claim 1,
    wherein at least one of the electrode substrates generates electrical energy by moving in such a way that a degree of immersion thereof into the ionic liquid or water changes.

6. The energy conversion device using change of contact surface contacting liquid according to claim 1,
    wherein a hydrophobic material layer is stacked on the energy conversion layer so as to facilitate the change of the contact surface contacting the ionic liquid or water.

7. The energy conversion device using change of contact surface contacting liquid according to claim 6,
    wherein the hydrophobic material layer includes at least one of: silane-based material, fluoropolymer material, trichlorosilane, trimethoxysilane, pentafluorophenylpropyl trichlorosilane, (benzyloxy)alkyltrimethoxysilane, (benzyloxy)alkyltrichlorosilane, hexamethyldisilazane, octadecyltrichlorosilane, octadecyltrimethoxy silane, and divinyltetramethyldisiloxane-bis(benzo cyclobutene).

8. The energy conversion device using change of contact surface contacting liquid according to claim 1,
    wherein the ionic liquid includes at least one of: NaCl, LiCl, $NaNO_3$, $Na_2SiO_3$, $AlCl_3$—NaCl, LiCl—KCl, KCl, Na, NaOH, $H_2SO_4$, $CH_3COOH$, HF, $CuSO_4$, ethylene glycol, propylene glycol and AgCl.

9. An energy conversion device using change of contact surface contacting liquid comprising:
    a first electrode substrate and a second electrode substrate which are spaced apart and facing each other;
    a conductive liquid which is in contact with the first electrode substrate and the second electrode substrate, wherein the contact surface of each electrode substrate is to be changed; and
    an energy conversion layer, which is formed in at least one of the first electrode substrate and the second electrode substrate, generating electrical energy in accordance with the change of the contact surface, wherein
    the energy conversion layer includes a layer comprising a mixture of organic and inorganic materials,
    wherein the energy conversion device is not connected to an external power source for depolarizing the conductive liquid.

10. The energy conversion device using change of contact surface contacting liquid according to claim 9,
    wherein a hydrophile material layer is stacked on the energy conversion layer so as to facilitate the change of the contact surface contacting the conductive liquid.

11. The energy conversion device using change of contact surface contacting liquid according to claim 10,
    wherein the layer has a structure for enlarging the contact surface contacting the conductive liquid.

12. The energy conversion device using change of contact surface contacting liquid according to claim 10,
    wherein the energy conversion device is connected to one or more of other energy conversion devices in an array form.

13. The energy conversion device using change of contact surface contacting liquid according to claim 12,
    wherein at least a part of a plurality of substrates which constitute a plurality of energy conversion devices including the energy conversion device and said one or more of other energy conversion devices are supported by a common supporting structure.

14. The energy conversion device using change of contact surface contacting liquid according to claim 10,
    wherein at least one of the electrode substrates generates electrical energy by moving in such a way that a degree of immersion thereof into the conductive liquid changes.

15. The energy conversion device using change of contact surface contacting liquid according to claim 10, wherein the hydrophile material layer includes poly acrylic acid, acrylamides, maleic anhydride copolymers, methacrylate, ethacrylate, amine-functional polymers, amine-functional polymers, polystyrenesulfonate, vinyl acids, vinyl alcohols, or a material including at least one functional group of —NH, —CO—, —NH$_2$, —OH and —COOH.

16. The energy conversion device using change of contact surface contacting liquid according to claim 10,
wherein the range of the specific resistivity of the conductive liquid is 1 μΩ/cm to 1000 μΩ/cm, and the dielectric constant K is lower than or equal to 5.

17. The energy conversion device using change of contact surface contacting liquid according to claim 1,
wherein the organic material comprises at least one material of: polymethylmethacrylate, polyethylene, polystyrene, polyvinylpyrrolidone, poly(4-vinylpenol) or polyethersulfone, poly(4-methoxyphenylacrylate), poly(phenylacrylate), poly(2,2,2-trifluoroethyl methacrylate), cyanoethylpullulan, polyvinyl chloride, poly(parabanic acid resin), poly(t-butylstyrene), polythienylenevinylene, polyvinylacetate, poly(vinyl alcohol), poly(rmethylstyrene), poly(vinyl alcohol)-co-poly(vinyl acetate)-co-poly(itaconic acid), polyolefin, polyacrylate, parylene-C, polyimide, octadecyltrichlorosilane, poly(triarylamine), poly-3-hexylthiophene, cross-linked poly-4-vinylphenol, poly(perfluoroalkenylvinyl ether), nylon-6, n-octadecylphosphonic acid, polytetrafluoroethylene, silicone, polyurethane, latex, cellulose acetate, poly(hydroxy ethyl methacrylate), polylactide, polyglycolide, and polyglycolide-co-lactide; and
the inorganic material comprises at least one material of: SiO$_2$, TiO$_2$, Al$_2$O$_3$, Ta$_2$O$_5$, tantalum pentoxide, zinc oxide, tantalum pentoxide, yttrium oxide, cerium oxide, titanium dioxide, barium titanate, barium zirconate titanate, zirconium dioxide, lanthanum oxide, hafnon, lanthanum aluminate, silicon nitride, perovskite materials, strontium titanate, barium strontium titanate, lead zirconate titanate, calcium copper titanate, or HfO$_2$, apatite of A$_{10}$(MO$_4$)$_6$X$_2$, hydroxyapatite of Ca$_{10}$(PO$_4$)$_6$(OH)$_2$tricalcium phosphate, Na$_2$O—CaO—SiO$_2$, and bioglass of CaO—SiO$_2$—P$_2$O$_5$.

18. The energy conversion device using change of contact surface contacting liquid according to claim 1,
wherein the first electrode substrate or the second electrode substrate includes an electrode,
wherein the electrode is an inorganic electrode including at least one of ITO, IGO, chrome, aluminum, indium zinc oxide (IZO), indium gallium zinc oxide (IGZO), ZnO, ZnO$_2$ and TiO$_2$; or a metal electrode including at least one of platinum, gold, silver, aluminum, iron and copper; or an organic electrode including at least one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of chrome, SUS 304, SUS 316, SUS 316L, Co—Cr alloy, Ti alloy, nitinol (Ni—Ti) and polyparaphenylenevinylene.

19. The energy conversion device using change of contact surface contacting liquid according to claim 1,
wherein at least one of the first electrode substrate or the second electrode substrate is a metal substrate, a glass substrate, a ceramic substrate, or a polymer material substrate,
wherein the polymer material substrate is a plastic substrate or a film which includes at least one of polyethylene terephthalate, polyarylate, polymethylmethacrylate, polyethylenenaphthalate, polyethersulfone, polyimide, polycarbonate and fiber reinforced plastics, and
the ceramic substrate is a substrate using a ceramic material which includes at least one of alumina, berilia, aluminum nitride, silicon carbide, mullite and silicon.

20. The energy conversion device using change of contact surface contacting liquid according to claim 1, further comprising:
a non-conductive gas disposed between the first electrode substrate and the second electrode substrate.

21. The energy conversion device using change of contact surface contacting liquid according to claim 20,
wherein the non-conductive gas includes at least one of air, oxygen, nitrogen, argon, helium, neon, krypton, xenon and radon.

* * * * *